(12) United States Patent
Greve

(10) Patent No.: US 6,604,625 B2
(45) Date of Patent: Aug. 12, 2003

(54) OPERATING MODULAR CONVEYOR BELTS WITH MIGRATING HINGE PINS

(75) Inventor: Christopher G. Greve, Covington, LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 10/000,116

(22) Filed: Oct. 31, 2001

(65) Prior Publication Data

US 2003/0079970 A1 May 1, 2003

(51) Int. Cl.[7] ............................................... B65G 17/06
(52) U.S. Cl. ........................................................ 198/853
(58) Field of Search ......................................... 198/853

(56) References Cited

U.S. PATENT DOCUMENTS

| | | |
|---|---|---|
| 3,785,476 A | 1/1974 | Poerink |
| 5,125,874 A | 6/1992 | Fryer et al. |

FOREIGN PATENT DOCUMENTS

WO    WO 99/65801 A1    12/1999

*Primary Examiner*—Joseph E. Valenza
(74) *Attorney, Agent, or Firm*—James T. Cronvich

(57) ABSTRACT

Structure and method for maintaining side-by-side belt modules aligned in a belt row of a modular conveyor belt in the absence of a hinge pin along at least a portion of one end of the belt row. Mating engagement structure on confronting sides of side-by-side modules maintains the modules in alignment. One version of mating engagement structure includes a protrusion, such as a rectangular pad, extending from a side of a belt module and a mating receptacle formed at the confronting side of an adjacent side-by-side module. The receptacle is defined by discontinuous wall structure forming a gap opening toward the top or bottom surface of the module. The modules are put together by sliding the protrusion into the receptacle through the gap in the wall structure. When modules with the mating engagement structure are interconnected side by side by a hinge pin through the hinge eyes along one end, the modules remain aligned despite the absence of a hinge pin interconnecting the hinge eyes on the opposite end.

13 Claims, 2 Drawing Sheets

OPERATING MODULAR CONVEYOR BELTS WITH MIGRATING HINGE PINS

BACKGROUND

The invention relates generally to power-driven conveyor belts and, more particularly, to means and methods for operating modular conveyor belts interconnected row to row by hinge pins even when hinge pins migrate from their operative positions.

Conventional modular conveyor belts and chains are constructed of modular links, or belt modules, arranged end to end and side to side in belt rows. Spaced-apart hinge eyes extending from each end of the modules include aligned openings. The hinge eyes along one end of a row of modules are interleaved with the hinge eyes of an adjacent row. Pivot rods, or hinge pins, journalled in the aligned openings of interleaved hinge eyes, connect adjacent rows together end to end to form an endless conveyor belt capable of articulating about a drive sprocket or drum at the hinge formed between adjacent belt rows.

Because they do not corrode and are easy to clean, modular plastic conveyor belts are often used instead of metal belts, especially in food-related applications. Usually, the hinge pins in plastic belts are also made of plastic. Hinge pins are retained in the hinges by various means. Sometimes the hinge pins terminate at both ends in enlarged heads that are too big to enter the openings in the hinge eyes. In other pin retention schemes, integral belt structure in the vicinity of the hinge eyes obstructs the pin from exiting the aligned openings. Still other pin retention schemes use insertable occluding pieces to keep the pins in place. But all of these rod retention schemes can fail. Extreme or rapidly changing temperatures, for example, can cause pin retention problems because of stresses applied to the pins by uneven expansion and contraction of the pin, the interconnected belt modules, and the retention elements. These stresses can cause, for example, the heads to pop off, the retention structure to give way, or the insertable occlusions to move out of retaining positions. Once pin retention is lost, a hinge pin can work its way completely or part way out of the belt. As an unretained hinge pin migrates toward one side of the belt, the edge module from which the hinge pin migrates is no longer connected to its neighbor along that end of the row. This problem is especially acute in modules with narrower edge modules. If the edge module is not supported from below or along its outer side edge, it will pivot about its other hinge pin out of alignment with the other modules in the row. Once out of alignment, the edge module is more susceptible to catching on conveyor structure and to improperly engaging drive and idler sprockets. Damage to the belt can occur quickly.

During the repair or installation of a modular conveyor belt, a hinge pin has to be inserted into the interleaved hinge eyes of adjacent rows to connect the rows together. It is often difficult to align the modules on each row because each module of the row is free to rotate about the hinge pin at the other end of the row. Each module of the row can rotate independently of the others. The more modules there are per row, the harder it is to line them all up. And then the modules on the adjacent row have to be lined up, too. Aligning the modules along adjacent rows of a wide belt before interleaving the hinge eyes to ready the belt for insertion of the hinge pins can be a time-consuming and frustrating task.

Thus, there is a need to improve modular conveyor belts to prevent or delay the damage that can be caused by a migrating hinge pin. There is also a need for a modular conveyor belt whose hinge eyes can be readily aligned for easy insertion of a hinge pin.

SUMMARY

These needs and others are satisfied by a modular conveyor belt having features of the invention. The belt is of the type constructed of a series of rows of belt modules arranged side by side. The modules extend in the direction of belt travel from a first end to a second end and through their thickness from a generally planar top surface to a generally parallel bottom surface. A first set of hinge eyes is arranged along the first end; a second set of hinge eyes is arranged along the second end. The first set of hinge eyes of a row is interleaved with the second set of hinge eyes of an adjacent row. A hinge pin extends through the interleaved hinge eyes to interconnect the modules along the adjacent rows at a hinge. Mating engagement structure on confronting side-by-side belt modules in a row maintains the side-by-side modules in alignment even in the absence of a hinge pin extending through any of the hinge eyes of at least one of the modules along one of the ends of the row. The mating engagement structure includes a protrusion extending from a first side of a first belt module and a receptacle formed at the confronting second side of a second module in the row. The receptacle is defined by discontinuous wall structure with a gap opening toward the top or bottom surface of the modules, or toward both surfaces. The receptacle receives the protrusion from the adjacent module through the gap in the discontinuous wall structure as the side-by-side modules are engaged from a direction perpendicular to the generally planar top and bottom surfaces. Once engaged, the modules remain aligned even in the absence of a connecting hinge pin.

The protrusion is, in one version, a generally rectangular pad; and the receptacle is a recess defined by a pair of generally vertical walls formed in the second side of the second belt module. This engagement structure is especially useful when one of the engaged modules is an edge module forming a side edge of the belt. In another version, the receptacle is U-shaped, with the wall structure defining the bottom of the U forming a stop for the protrusion. In yet other versions, the protrusion is T-shaped or a pair of parallel ribs.

A method for maintaining side-by-side belt modules aligned in a belt row in the absence of a hinge pin along at least a portion of an end of the belt row includes: forming a protrusion on a first side of a first belt module; forming a receptacle defined by discontinuous wall structure forming a gap in the receptacle on a second side of a second belt module; engaging the protrusion with the receptacle through the gap in the discontinuous wall structure of the receptacle; and connecting the belt row to an adjacent belt row with a hinge pin. The protrusion and receptacle, in various versions of the invention, can be formed by injection-molding, machining, or affixing.

Thus, an improvement to the construction of a conveyor belt and a method for constructing such a belt result in a belt that is easier to install or repair and that can be operated even after a hinge pin has migrated from its usual position.

DRAWINGS

These and other features, aspects, and advantages of the invention are described in more detail in the following description, appended claims, and accompanying drawings, in which:

DETAILED DESCRIPTION

Figure 1:
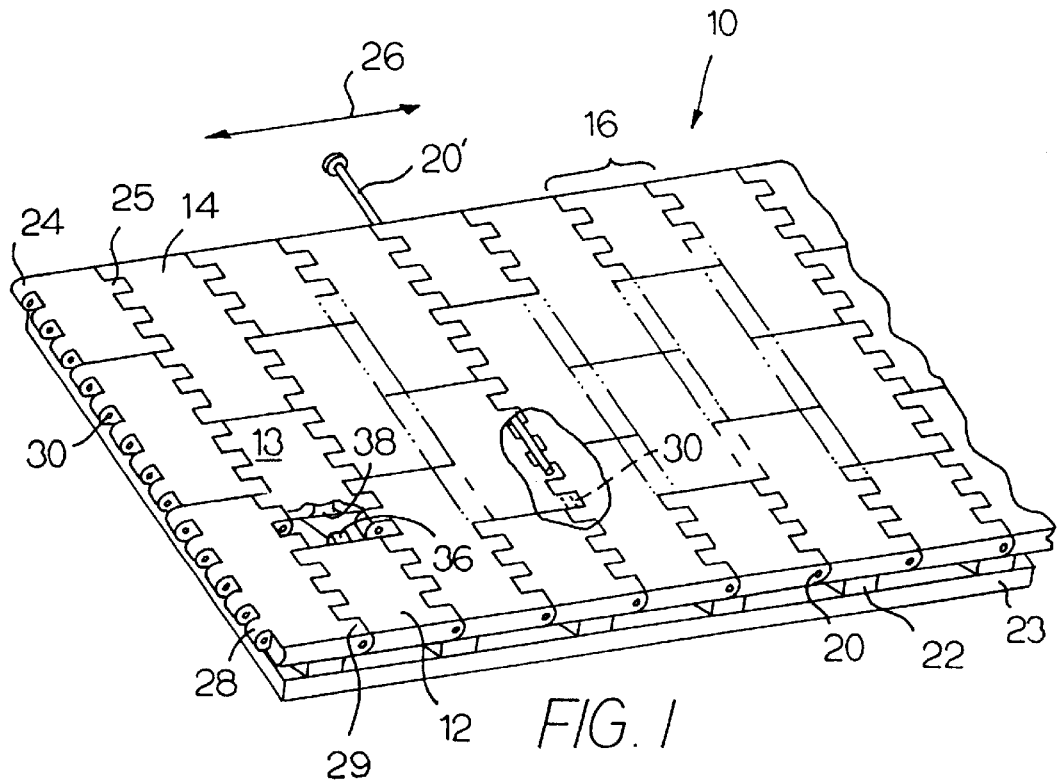
FIG. 1 is a pictorial view of a portion of a bricklayed modular conveyor belt, partially cut away, embodying features of the invention.
Figure 2:
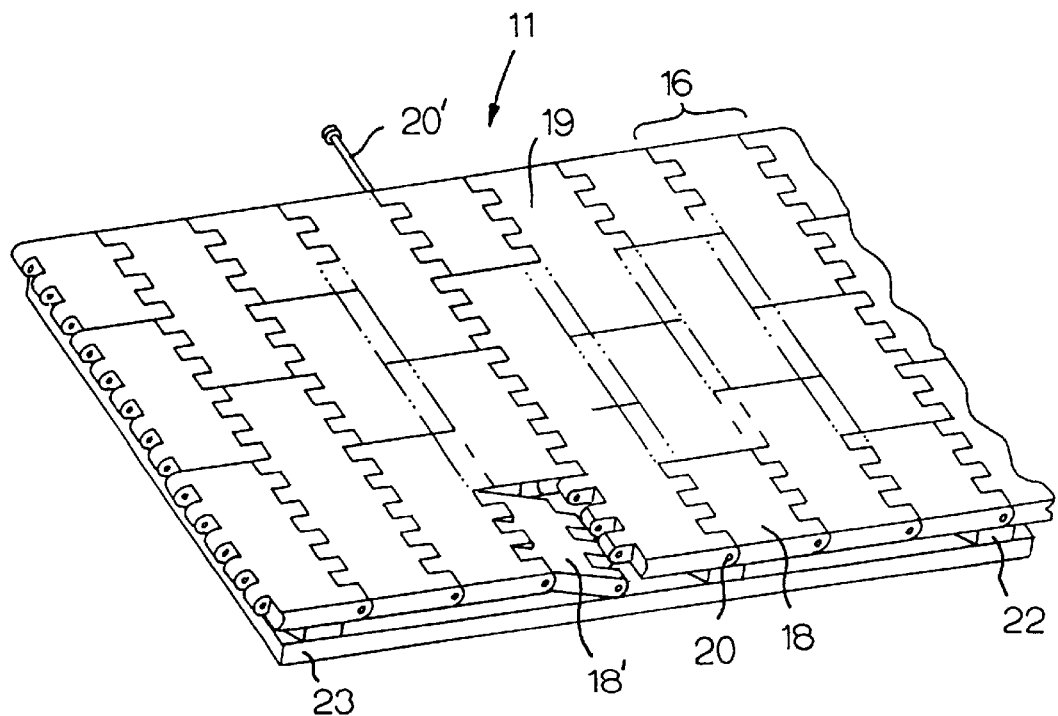
FIG. 2 is a pictorial view of a portion of a prior art bricklayed modular conveyor belt illustrating a problem caused by a migrating hinge pin.
Figure 3:
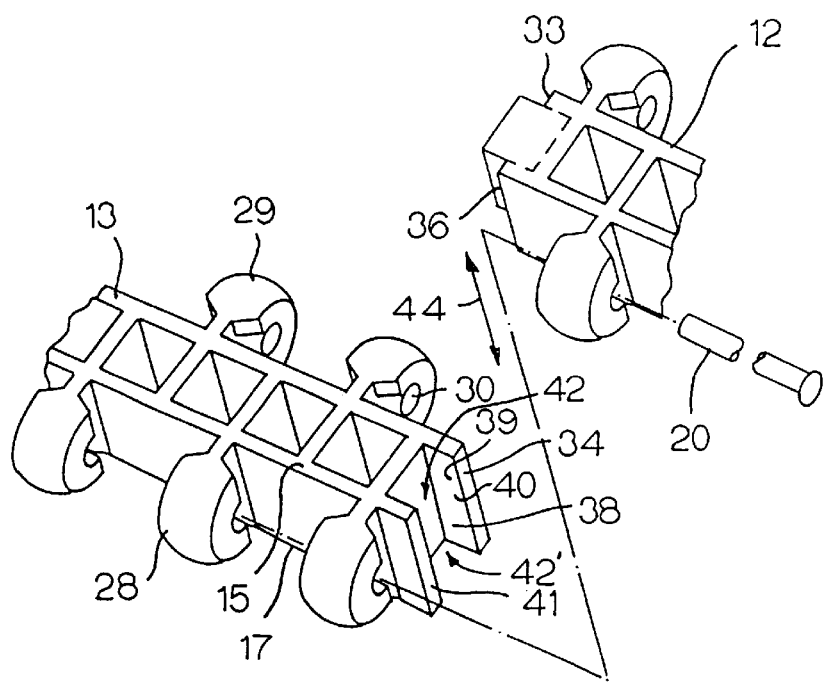
FIG. 3 is an exploded view of two partial side-by-side belt modules in one row of the conveyor belt of FIG. 1.

A modular conveyor belt 10 and modules 12, 13, 14 having features of the invention are shown in FIGS. 1 and 3. First, however, the prior art modular belt 11 shown in FIG. 2 is described. The belt is made of a series of rows 16 of belt modules 18, 19 pivotably connected end to end by hinge pins 20. The belt is supported on wearstrips 22 carried by a conveyor frame 23. (A chevron wearstrip pattern is a common arrangement.) As shown in FIG. 2, if the hinge pin 20' migrates out one side of the belt, for example, so that it no longer engages belt edge module 18', the module is free to drop its unrestrained end out of alignment with its neighboring belt module in the row. The unrestrained module, which is still pivotably connected to the belt by a hinge pin at its other end, is likely to catch on something, such as the supporting wearstrips 22. Clearly, the freely flopping edge module can quickly cause damage to the belt or the conveyor frame or to conveyed products.

The improved modular conveyor belt 10 in FIG. 1, on the other hand, solves the problem caused by migrating hinge pins. The belt is constructed of a series of rows 16 of side-by-side belt modules 12, 13, 14 forming a generally planar top, or outer, surface 15 and an opposite bottom, or inner, surface 17. In FIG. 1, only a portion of the carryway section of the conveyor is shown. The belt modules may be made of metal, but are more often made of injection-molded thermoplastic materials, such as polypropylene, polyethylene, acetal, nylon, and composite polymers. Intralox, Inc. of Harahan, La., USA, is just one manufacturer of a variety of modular plastic conveyor belts. Each of the belt modules extends from a first end 24 to a second end 25 in a direction of belt travel 26. A first set of hinge eyes 28 extends along the first end of the row, and a second set 29 extends along the second end of the row. The rows are connected end to end with the first set of hinge eyes of a row interleaved with the second set of hinge eyes and an adjacent row by hinge pins 20. The hinge pins extend through aligned openings 30 in the interleaved hinge eyes to form a hinge between adjacent belt rows. Like belt modules, hinge pins can be metal or plastic.

Details of example modules are shown in FIG. 3. The belt module 12 is, for example, an edge module that forms a side edge of the conveyor belt. Its neighboring module 13 in the row can be either another edge module (if the belt row includes only two modules) or an interior module (if the belt row includes three or more modules). In the example of FIG. 3, the two modules have engagement structure along their confronting sides 33, 34. In particular, the edge module 12 has a protrusion 36 in the form of a generally rectangular pad extending outward from its side 33. The protrusion is sized to fit in a mating receptacle 38 formed in the confronting side 34 of the neighboring module 13. The receptacle is defined by a discontinuous wall structure 39. A gap 42 opening toward the top surface 15 of the module and another gap 42' opening toward the bottom surface 17 are two discontinuities in the wall structure. Two generally vertical walls 40, 41 extending from the side of the module 13 define a recess that forms the receptacle. In this example, the walls are merely extensions of transverse elements that extend across the width of the module and intermittently form driving surfaces for the teeth of drive sprockets. The gaps in the wall structure defining the receptacle are designed to allow the two modules to be engaged along a direction 44 perpendicular to the top and bottom surfaces, i.e., by sliding into position from above or below. When the belt is assembled with the edge module 12 abutting its neighboring module 13, the protrusion 36 is received by the mating receptacle 38 through one of the gaps. In this way, a module can be simply dropped in place in a belt—even a largely assembled belt—without interference from hinge eyes or other structure on neighboring belt modules. By the mating of the engagement structure, the two side-by-side modules remain aligned as long as a hinge pin 20 interconnects their hinge eyes along one end. As shown in the cut-away portion of FIG. 1, even if a hinge pin is absent at the other end, the engagement structure prevents the modules from rotating about the remaining hinge pin and dropping out of alignment.

Figures 4A, 4B, 4C:
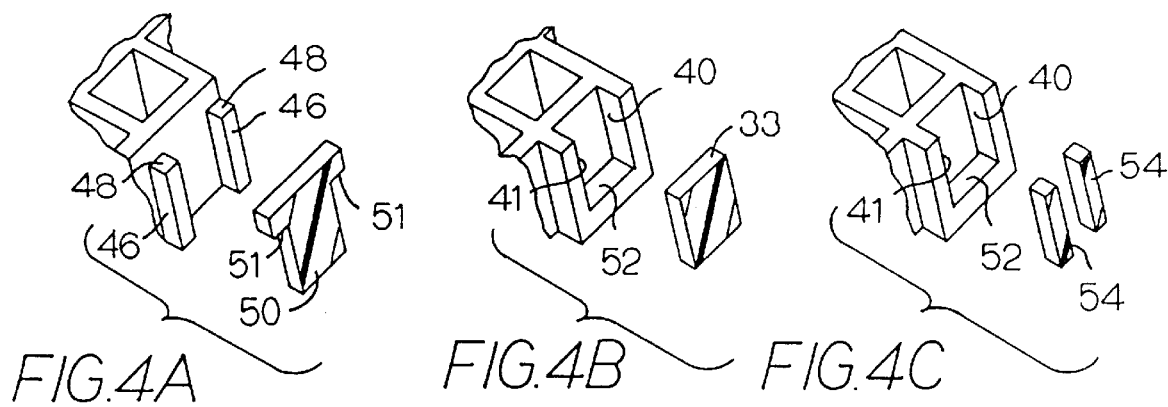
FIGS. 4A–4C are partial isometric views of alternative versions of mating engagement structure at the confronting sides of belt modules as in FIG. 3.

Other versions of engagement structure are shown in FIGS. 4A–4C. The wall structure defining the receptacle in FIG. 4A includes a pair of parallel walls 46 with top support shelves 48 recessed from the top surface 15 of the module. The mating protrusion 50 on the neighboring module is T-shaped with shoulders 51 that rest on the support shelves when the modules are engaged. The shelves act as stops that help align the side-by-side modules during belt assembly. In the version shown in FIG. 4B, the vertical walls 40, 41 are connected by a connecting wall 52 to form a U-shaped receptacle. The connecting wall acts as a stop for the mating rectangular protrusion 33. In the version of FIG. 4C, the rectangular protrusion of FIG. 4B is replaced by a pair of parallel ribs 54 that fit within the parallel vertical walls of the mating engagement structure.

The engagement structure feature is also useful in belt assembly. Because modules with the feature remain aligned once a hinge pin interconnects them along one end, it is easy to insert a hinge pin through the other end that is already aligned. Thus, the problem of reassembling a wide belt with a lot of modules flopping around is avoided.

A method for achieving the advantages of the invention includes forming a protrusion on a first side of a first belt module. The protrusion could be integrally molded with the rest of the module such as in an injection-molding process, or it could be formed separately and affixed by screwing, thermal bonding, or gluing to the side of the module (as indicated by the dashed lines in FIG. 3). A receptacle defined by discontinuous wall structure with a gap at the discontinuity sized to admit the protrusion is formed on the second side of a second module. Like the protrusion, the receptacle could be formed integrally with the module as it is molded. The receptacle could alternatively be formed in a secondary manufacturing step, such as by machining. The protrusion is engaged with the receptacle through the gap in the discontinuous wall structure. Then the belt row is connected to an adjacent row with a hinge pin. Once connected according to this method, a modular conveyor belt can run safely even after a hinge pin has migrated out of full engagement with the hinge eyes along one end of a module.

Although the invention has been described in detail with respect to preferred versions, other versions are possible. For example, the mating engagement structure could take on many forms equivalent to the protrusions and receptacles described as long as their interaction also interferes with the tendency of adjacent modules to rotate out of alignment. The engagement structure was shown in conjunction with the seam in the belt formed along an edge module, but the engagement structure could be used at every seam, including seams between internal belt modules. The shapes of the protrusion and the mating receptacle can be other than the shapes described. Other shapes, including, but not limited to, triangular, trapezoidal, and circular, could be used effectively to keep the modules aligned. As these examples suggest, the scope of the claims should not be limited to the description of the preferred versions.

What I claim is:

1. In a modular conveyor belt of the type comprising a series of rows of side-by-side belt modules extending from a first end to a second end in the direction of belt travel and from a top surface to a bottom surface through the thickness of the modules, with a first set of hinge eyes along the first end and a second set of hinge eyes along the second end, the rows being connected end to end with the first set of hinge eyes of a row interleaved with the second set of hinge eyes of an adjacent row by a hinge pin extending through the interleaved hinge eyes to form a hinge between adjacent rows, the improvement comprising:

a protrusion extending from a first side of a first belt module in a belt row; and a receptacle formed by discontinuous wall structure at the confronting second side of a second module in the belt row, wherein the discontinuous wall structure defines a gap in the wall structure opening toward at least one of the top surface and the bottom surface of the second module to receive the protrusion into the receptacle through the gap from a direction generally perpendicular to the top and bottom surfaces of the modules.

2. The improvement in modular conveyor belts as in claim 1 wherein the protrusion is a generally rectangular pad and the receptacle is a recess defined between two generally vertical walls formed in the second side of the second module.

3. The improvement in modular conveyor belts as in claim 1 wherein the receptacle is defined by U-shaped wall structure.

4. The improvement in modular conveyor belts as in claim 1 wherein the protrusion is T-shaped.

5. The improvement in modular conveyor belts as in claim 1 wherein the protrusion includes a pair of parallel ribs.

6. The improvement in modular conveyor belts as in claim 1 wherein one of the side-by-side modules forms a side edge of the belt.

7. The improvement in modular conveyor belts as in claim 1 wherein the protrusion and the receptacle are formed by injection molding.

8. The improvement in modular conveyor belts as in claim 1 wherein the protrusion is separately formed and then affixed to the first side.

9. The improvement in modular conveyor belts as in claim 1 wherein the receptacle is formed by machining.

10. A method for maintaining side-by-side belt modules aligned in a belt row of a modular conveyor belt in the absence of a hinge pin along at least a portion of an end of the belt row, the method comprising:

forming a protrusion on a first side of a first belt module;

forming a receptacle defined by discontinuous wall structure forming a gap in the receptacle on a second side of a second belt module;

engaging the protrusion with the receptacle through the gap in the discontinuous wall structure of the receptacle; and connecting the belt row to an adjacent belt row with a hinge pin.

11. The method of claim 10 wherein the protrusion and the receptacle are formed by injection molding.

12. The method of claim 10 wherein the protrusion is separately formed and then affixed to the first side.

13. The method of claim 10 wherein the receptacle is formed by machining.

* * * * *